United States Patent [19]

Vreeland et al.

[11] Patent Number: 5,345,680
[45] Date of Patent: Sep. 13, 1994

[54] SHAVING AID FOR WET RAZOR

[75] Inventors: William E. Vreeland, Shelton; Robert Qubick, Bridgeport, both of Conn.

[73] Assignee: Warner-Lambert Company, Morris Plains, N.J.

[21] Appl. No.: 136,714

[22] Filed: Oct. 13, 1993

Related U.S. Application Data

[63] Continuation of Ser. No. 832,207, Feb. 6, 1992, abandoned.

[51] Int. Cl.$^5$ .............................................. B26B 19/40
[52] U.S. Cl. ........................................ 30/41; 30/90; 424/73
[58] Field of Search ................... 30/40, 41, 50, 85, 90; 424/73

[56] References Cited

U.S. PATENT DOCUMENTS

| | | |
|---|---|---|
| 2,145,583 | 1/1939 | Carlson . |
| 3,811,349 | 5/1974 | Jennings . |
| 4,170,821 | 10/1979 | Booth . |
| 4,331,653 | 5/1982 | Brown et al. . |
| 4,381,293 | 4/1983 | Michel . |
| 4,624,051 | 11/1986 | Apprille, Jr. et al. . |
| 4,778,640 | 10/1988 | Braun et al. . |
| 4,850,106 | 7/1989 | Baun et al. ............................ 30/41 |
| 4,996,772 | 3/1991 | Iten ...................................... 30/41 |
| 5,079,839 | 1/1992 | Conrad et al. ....................... 30/41 |
| 5,095,619 | 3/1992 | Davis et al. .......................... 30/41 |

FOREIGN PATENT DOCUMENTS

| | | | |
|---|---|---|---|
| 828084 | 2/1960 | United Kingdom | 30/41 |
| 2024082 | 1/1980 | United Kingdom | 30/41 |

*Primary Examiner*—Richard K. Seidel
*Assistant Examiner*—Paul M. Heyrana
*Attorney, Agent, or Firm*—Charles W. Almer, III

[57] ABSTRACT

A shaving aid for use with a wet razor comprising a water insoluble polymeric material including at least two different polymers, and a water soluble active ingredient, such as polyethylene oxide. One embodiment of the present invention comprises a flexible, polypropylene razor head, having a shaving aid bonded directly thereto. The shaving aid comprises a water soluble polyethylene oxide and water-insoluble polystyrene and polypropylene. Other additives such as pigments and skin-treating additives are also disclosed. Another embodiment of the present invention comprises the shaving aid molded onto a flexible blade support which is preferably formed of polypropylene.

29 Claims, No Drawings

SHAVING AID FOR WET RAZOR

BACKGROUND

This is a continuation of 07/832,207, filed Feb. 6, 1992 abandoned Dec. 13, 1993.

The present invention is directed to a shaving aid for use with a wet razor and, more particularly, to a shaving aid having increased shelf life and better adhesion to a razor head.

Various types of shaving aids are known in the razor industry. One popular type of shaving aid contains at least one water insoluble polymeric matrix and a water soluble material which exudes out of the insoluble matrix upon contact with water during shaving. Such shaving aids have been attached to razor heads mechanically, for example, with snap-in fittings or by molding the shaving aid into recesses containing anchors in a razor head. When the thermoplastic material hardens, it is anchored into these recesses and thereby secured to the razor head. The present invention is directed to a shaving aid which may be successfully chemically bonded to a razor head thereby eliminating the need for mechanical securement.

In order for a shaving aid to be commercially acceptable, it has been found that two characteristic properties are very important. First, the shaving aid must adhere well to the razor head. Secondly, the shaving aid must be able to withstand extreme environments encountered between the point of manufacture and the point of final use. For example, such adverse conditions may include temperatures above 90° F. and relative humidities above 60%.

It is particularly desirable to provide a shaving aid which can meet these criteria when bonded to a razor head formed substantially of polypropylene. Polypropylene has recently enjoyed increased acceptance in razor head manufacturing in light of the advent of flexible razor heads. Polypropylene is relatively inexpensive and has good durability and elasticity making polypropylene particularly suitable for use in flexible razor heads.

It is therefore desirable to provide a shaving aid having superior bonding capabilities with a flexible, polypropylene razor head and also the ability to withstand adverse environmental conditions encountered prior to shaving. As used herein, the term "razor head" is meant to include both the operative section of disposable razors as well as disposable cartridges designed for attachment to a separate razor. As used herein, the term "shaving aid" refers equally to either the active ingredient combined with a water-insoluble micro-porous matrix structure or to that active ingredient itself.

SUMMARY OF THE INVENTION

One embodiment of the present invention comprises a shaving aid for use with a wet razor comprising a water insoluble polymeric material including at least two different polymers, and a water soluble polymeric material, such as polyethylene oxide. Another embodiment of the present invention comprises a razor head, such as a flexible, polypropylene razor head, having a shaving aid bonded directly thereto. The shaving aid comprises a water soluble polymeric material and a water insoluble polymeric matrix comprising polystyrene and polypropylene. Other additives such as pigments and skin-treating compounds may also be included in the shaving aid.

DETAILED DESCRIPTION

The present invention provides a shaving aid exhibiting improved bonding characteristics as well as shelf stability even in extreme environments when bonded to a razor head, particularly to a razor head formed substantially from polypropylene. The razor head of one embodiment of the present invention comprises at least one water-soluble polymeric component, such as polyethylene oxide, and a water-insoluble matrix comprising polystyrene and polypropylene.

One embodiment of the present invention preferably comprises about 15%–40% water insoluble polymeric matrix material, of which about 30%–70% comprises polystyrene while about 30%–70% comprises polypropylene. A preferred embodiment of the present invention comprises about 18%–25% of a water insoluble polymeric matrix material, more preferably about 20%–25%, with polystyrene in an amount of about 40%–65%, more preferably about 50%–60%, and polypropylene in an amount of about 35%–60% more preferably about 40%–50%. The remaining material in the shaving aid preferably comprises a major portion of polyethylene oxide.

The polystyrene of the present invention is preferably medium impact polystyrene, however, other forms of polystyrene such as general purpose polystyrene may also be utilized. The polystyrene of the present invention may also be replaced in whole or in part by acrylonitrile butadiene styrene (ABS).

Those skilled in the art will appreciate that the polyethylene oxide active ingredient may comprise a mixture of high molecular weight polyethylene oxide and low molecular weight polyethylene oxide. For example, a mixture of POLYOX COAGULANT polyethylene oxide having a molecular weight of about 5 million and POLYOX WSR-N-750 polyethylene oxide having a molecular weight of about 300,000 has been found suitable.

Other compatible active ingredients which may also be incorporated into the shaving aid include:

(A) A lubricating agent for reducing the frictional forces between the razor and the skin, e.g., a microencapsulated silicone oil.

(B) An additional agent which reduces the drag between the razor parts and the shaver's face, e.g., a natural polysaccharide derived from plant materials such as guar gum.

(C) An agent which modifies the chemical structure of the hair to allow the razor blade to pass through the whiskers very easily, e.g., a depilatory agent.

(D) A cleaning agent which allows the whiskers and skin debris to be washed more easily from the razor parts during shaving, e.g., a silicone polyethylene oxide block copolymer and detergent such as sodium lauryl sulphate.

(E) A medicinal agent for killing bacteria, or repairing skin damage and abrasions.

(F) A cosmetic agent for softening, smoothing, conditioning or improving the skin.

(G) A blood coagulant for the suppression of bleeding that occurs from nicks and cuts.

(H) An astringent for constricting blood vessels thereby stemming the flow of bodily fluids such as lymph, which may exude from skin which has been irritated during shaving.

The configuration of the shaving aid, its place of application to the razor cartridge, the manner of attachment and/or other means and method of incorporation may vary widely to fit particular design requirements.

The shaving aid of the present invention maintains an acceptable appearance and strong adherence to a polypropylene, flexible razor head, even when subjected to extreme ambient conditions.

EXAMPLES

In order to further illustrate the advantages of the present invention, a number of shaving aids were prepared and then exposed to 95% relative humidity (RH) at 108° F. for 72 hours. Table 1 provides the percentages of materials used in the preparation of examples 1-8.

TABLE 1

| Example | Polypropylene Compound | Polystyrene Compound | Total Polyethylene oxide |
|---|---|---|---|
| 1 | 0% | 20% | 80% |
| 2 | 5 | 15 | 80 |
| 3 | 10 | 10 | 80 |
| 4 | 10 | 20 | 70 |
| 5 | 10 | 15 | 75 |
| 6 | 15 | 15 | 70 |
| 7 | 20 | 15 | 65 |
| 8 | 20 | 0 | 80 |

The shaving aid of Example 1 lacked adequate adherence to a flexible, polypropylene razor head. Example 8, on the other hand, while adhering well, became very rugged and bumpy when exposed to the stated temperature and humidities. Examples 2 through 7 which are various embodiments of the present invention provided both adequate adherence to the polypropylene razor head and acceptable appearances even when exposed to the extreme temperatures and humidities stated above.

In order to obtain sufficient shaving comfort, the percentage of active ingredient is advantageously maintained at a level of at least about 50%, preferably at least 65%, most preferably at least 75%. The active ingredient is preferably polyethylene oxide though, as stated above, other active ingredients may be incorporated.

The polystyrene compound used in the above examples was medium impact polystyrene and had 10% titanium dioxide ($TiO_2$) incorporated therein as a white pigment. The polypropylene compound also included 10% $TiO_2$. Those skilled in the art will appreciate that minor amounts of processing aids and stabilizers may also be incorporated.

While not intending to be bound by a particular theory, it is believed that the high temperature and relative humidity caused the polyethylene oxide to expand during moisture absorption. The expanding polyethylene oxide is believed to cause the polypropylene to expand beyond its elastic limit so that even when the polyethylene oxide shrunk upon the loss of moisture, the polypropylene did not shrink back to its original size.

A preferred embodiment of the present invention comprises a flexible razor head formed substantially of polypropylene, for example comprising at least 75% or preferably at least 90% polypropylene, having the above described shaving aid bonded thereto.

Another embodiment of the present invention comprises a process for insert molding a flexible razor head comprising the steps of 1) securely positioning at least one blade in a mold cavity; 2) molding a flexible razor head by injecting at least one polymer, preferably polypropylene, into the mold cavity; 3) modifying said mold cavity to receive a shaving aid on the flexible razor head; and 4) subsequently injecting a polymeric blend into the modified mold cavity wherein said polymeric blend comprises:
 polypropylene,
 at least one polymer from the group consisting of ABS and polystyrene, and
 at least one water-soluble active ingredient, preferably comprising polyethylene oxide.

We claim:

1. A shaving aid for use with a wet razor:
 (a) said shaving aid comprising about 15%-40% of a water-insoluble matrix wherein:
  (i) about 30%-70% of said water-insoluble matrix comprises a polystyrene compound;
  (ii) about 25%-70% of said water-insoluble matrix comprises a polypropylene compound; and
 (b) said shaving aid further comprises at least 50% of at least one water-soluble active ingredient.

2. A shaving aid according to claim 1 comprising about 18%-35% of said water-insoluble polymer wherein said water-insoluble polymer comprises about 40%-65% polystyrene compound and about 35%-60% polypropylene compound.

3. A shaving aid according to claim 1 comprising about 20%-25% of said water-insoluble matrix and wherein said water-insoluble matrix comprises:
 (a) about 50%-60% polystyrene compound; and
 (b) about 40%-50% polypropylene compound.

4. A shaving aid according to claim 1 wherein said active ingredient comprises polyethylene oxide.

5. A shaving aid according to claim 4 wherein said active ingredient comprises polyethylene oxide.

6. A shaving aid according to claim 1 wherein said active ingredient comprises at least 90% polyethylene oxide.

7. A shaving aid according to claim 6 wherein said active ingredient comprises at least 90% polyethylene oxide.

8. A shaving aid according to claim 1 comprising:
 about 10% of a polypropylene compound;
 about 10% of a polystyrene compound;
 at least 75% of a blend of high molecular weight polyethylene oxide having an average molecular weight of about 5 million and a low molecular weight polyethylene oxide having an average molecular weight of about 300,000.

9. A shaving aid according to claim 8 comprising approximately equal amounts of said high molecular weight polyethylene oxide and said low molecular weight polyethylene oxide.

10. A shaving aid according to claim 8 comprising
 about 10% of a polypropylene compound;
 about 10% of a polystyrene compound;
 about 20% high molecular weight polyethylene oxide having an average molecular weight of about 5 million; and
 about 60% of a low molecular weight polyethylene oxide having an average molecular weight of about 300,000.

11. A shaving aid according to claim 8 wherein said polystyrene compound comprises medium impact polystyrene and about 10% titanium dioxide pigment, and wherein said polypropylene compound comprises about 10% titanium dioxide pigment.

12. A shaving aid according to claim 1 comprising about 0.05–1% aloe vera.

13. A shaving aid according to claim 1 comprising at least one coloring agent.

14. A shaving aid for use with a wet razor:
(a) said shaving aid comprising about 15%–40% of a water-insoluble matrix:
 (i) about 30%–70% of said water-insoluble matrix comprises an ABS compound; and
 (ii) about 25%–70% of said water-insoluble matrix comprises a polypropylene compound; and
(b) said shaving aid further comprises at least 50% of at least one water-soluble active ingredient.

15. A shaving aid according to claim 14 comprising about 18%–35% of said water-insoluble matrix and wherein said water-insoluble matrix comprises:
(i) about 40%–65% ABS compound; and
(ii) about 35%–60% polypropylene compound.

16. A shaving aid according to claim 14 comprising about 20%–25% of said water-insoluble matrix and wherein said water-insoluble matrix comprises:
(i) about 50%–60% ABS compound; and
(ii) about 40%–50% polypropylene compound.

17. A flexible razor head comprising:
a flexible blade support comprising polypropylene;
a shaving aid attached to said flexible razor head:
(a) said shaving aid comprising about 15%–40% of a water-insoluble matrix wherein:
 (i) about 30%–70% of said water-insoluble matrix comprises a polystyrene compound; and
 (ii) about 25%–70% of said water-insoluble matrix comprises a polypropylene compound; and
(b) said shaving aid also comprising at least 50% of at least one active ingredient.

18. A flexible razor head according to claim 17 wherein said shaving aid comprises about 18%–35% of said water-insoluble matrix and wherein said water-insoluble matrix comprises:
(i) about 40%–65% polystyrene compound; and
(ii) about 35%–60% polypropylene compound.

19. A flexible razor head according to claim 18 wherein said shaving aid comprises about 18%–35% of said water-insoluble matrix and wherein said water-insoluble matrix comprises:
(i) about 40%–65% polystyrene compound; and
(ii) about 35%–60% polypropylene compound.

20. A shaving aid according to claim 17 wherein said active ingredient comprises polyethylene oxide.

21. A shaving aid according to claim 17 wherein said active ingredient comprises at least 90% polyethylene oxide.

22. A flexible razor head according to claim 17 wherein said blade support comprises at least 75% polypropylene.

23. A flexible razor head according to claim 17 wherein said blade support comprises at least 90% polypropylene.

24. A process for insert molding a flexible razor head comprising the steps of:
securely positioning at least one blade in a mold cavity;
molding a flexible razor head by injecting at least one first polymer into said mold cavity;
modifying said mold cavity to receive a shaving aid on said flexible razor head; and
subsequently injecting a polymeric blend into said modified mold cavity wherein said polymeric blend comprises:
 a polypropylene compound,
 at least one polymer from the group consisting of an ABS compound and a polystyrene compound, and
 at least one water-soluble active ingredient.

25. A process according to claim 24 wherein said first polymer comprises polypropylene.

26. A process according to claim 25 wherein said water-soluble active ingredient comprises polyethylene oxide.

27. A razor head comprising at least one blade supported by a support structure;
wherein said support structure comprises a first water-insoluble polymeric material;
said razor head comprising a shaving aid;
said shaving aid comprising a water-insoluble matrix comprising said first water-insoluble polymeric material and a second water-insoluble material which is different from said first water-insoluble polymeric material; and
said shaving aid also comprising at least one water-soluble active ingredient.

28. A razor head according to claim 27 wherein said first water-insoluble polymeric material comprises polypropylene.

29. A razor head according to claim 28 wherein said second water-insoluble polymeric material comprises polystyrene.

* * * * *